(12) United States Patent
Guidotti et al.

(10) Patent No.: US 9,021,245 B2
(45) Date of Patent: Apr. 28, 2015

(54) APPLYING SETTINGS IN A CLOUD COMPUTING ENVIRONMENT BASED ON GEOGRAPHICAL REGION

(75) Inventors: Alice Guidotti, Rome (IT); Bernardo Pastorelli, L'Aquila (IT); Leonardo Rosati, Rome (IT); Paolo Salerno, Monterotondo (IT)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 13/184,319

(22) Filed: Jul. 15, 2011

(65) Prior Publication Data

US 2013/0019089 A1    Jan. 17, 2013

(51) Int. Cl.
G06F 9/44 (2006.01)
H04L 29/08 (2006.01)
G06F 9/50 (2006.01)

(52) U.S. Cl.
CPC .................................. G06F 9/5072 (2013.01)

(58) Field of Classification Search
CPC ............................ G06F 9/4401; G06F 9/4406
USPC ........................................................ 713/1, 2
See application file for complete search history.

(56) References Cited

U.S. PATENT DOCUMENTS

| | | | |
|---|---|---|---|
| 6,904,401 B1 | 6/2005 | Hauduc et al. | |
| 7,441,113 B2 | 10/2008 | Chong et al. | |
| 8,521,189 B2 * | 8/2013 | Korkalo et al. | 455/456.3 |
| 2002/0085579 A1 * | 7/2002 | Sullivan et al. | 370/428 |
| 2005/0240574 A1 * | 10/2005 | Challenger et al. | 707/3 |
| 2006/0294199 A1 * | 12/2006 | Bertholf | 709/217 |
| 2007/0237096 A1 * | 10/2007 | Vengroff et al. | 370/254 |
| 2008/0189628 A1 * | 8/2008 | Liesche et al. | 715/762 |
| 2010/0253491 A1 * | 10/2010 | Grossman | 340/426.11 |
| 2010/0318649 A1 | 12/2010 | Moore et al. | |
| 2011/0179372 A1 * | 7/2011 | Moore et al. | 715/773 |
| 2011/0246653 A1 * | 10/2011 | Balasubramanian et al. | 709/226 |

OTHER PUBLICATIONS

Anonymous, "Smart Time Zone for Cloud Computing Resources," IP.com Prior Art Database, Aug. 4, 2010, retrieved from http://priorartdatabase.com/IPCOM/000198307 on Jul. 15, 2011 (8 pages).
"Cloud Computing," NIST Cloud Computing Forum and Workshop, May 20, 2010 (1 page).
Mell, et al., "The NIST Definition of Cloud Computing (Draft)," NIST, US Department of Commerce, Special Publication 800-145 (Draft), Jan. 2011 (7 pages).

* cited by examiner

*Primary Examiner* — Jaweed A Abbaszadeh
*Assistant Examiner* — Phil Nguyen
(74) *Attorney, Agent, or Firm* — Yee & Associates, P.C.; Parashos T. Kalaitzis

(57) ABSTRACT

A method, data processing system, and computer program product for applying a setting. A request for a set of resources is received. The request is to use the set of resources over a network connection. An address associated with a device from the request is identified. A geographic location of the device is identified based on the address. A set of settings for the set of resources is identified based on the geographic location of the device. The set of settings is applied to the set of resources.

25 Claims, 10 Drawing Sheets

APPLYING SETTINGS IN A CLOUD COMPUTING ENVIRONMENT BASED ON GEOGRAPHICAL REGION

BACKGROUND

1. Field

The disclosure relates generally to access of resources over a network connection and more specifically to a cloud computing environment. Still more particularly, the present disclosure relates to an application of settings to resources in a cloud computing environment.

2. Description of the Related Art

Users access resources to perform different tasks. Before the resource may be accessed, an administrator provisions the resource. Resource provisioning is a set of actions to prepare a resource with systems, data, and software to make the resource ready for network operation. Tasks when provisioning a resource include selecting a resource from a pool of available resources, loading software, configuring the system and the software for the resource.

Cloud computing describes a model for accessing resources over networks. In general, users of cloud computing systems do not own the physical infrastructure. Instead the users can pay for the resources they use. Cloud computing provides the resources to the user as if the resources are physically located with the user. As a result, a user can access a resource physically residing in any place in the world.

While cloud computing systems can provide access to resources physically residing in any place in the world, the location of the resources may still present issues. For example, when provisioning resources for cloud computing systems, administrators may not know the location of the user that will use the resource. Additionally, in cloud computing systems, users from different locations may use the same resource. Without knowledge of the user's location, settings established when provisioning the resource may not be the same as settings that are commonly used at the user's location. As a result, the user may experience issues with using resources that are not physically located with the user. The use of a cloud computing system may be less desirable for a user in certain scenarios.

Accordingly, it would be advantageous to have a method and apparatus, which take into account one or more of the issues discussed above as well as possibly other issues.

SUMMARY

The different illustrative embodiments provide a method, data processing system, and computer program product for applying a setting. A request for a set of resources is received. The request is to use the set of resources over a network connection. An address associated with a device from the request is identified. A geographic location of the device is identified based on the address. A set of settings for the set of resources is identified based on the geographic location of the device. The set of settings is applied to the set of resources.

DETAILED DESCRIPTION

Figure 1:
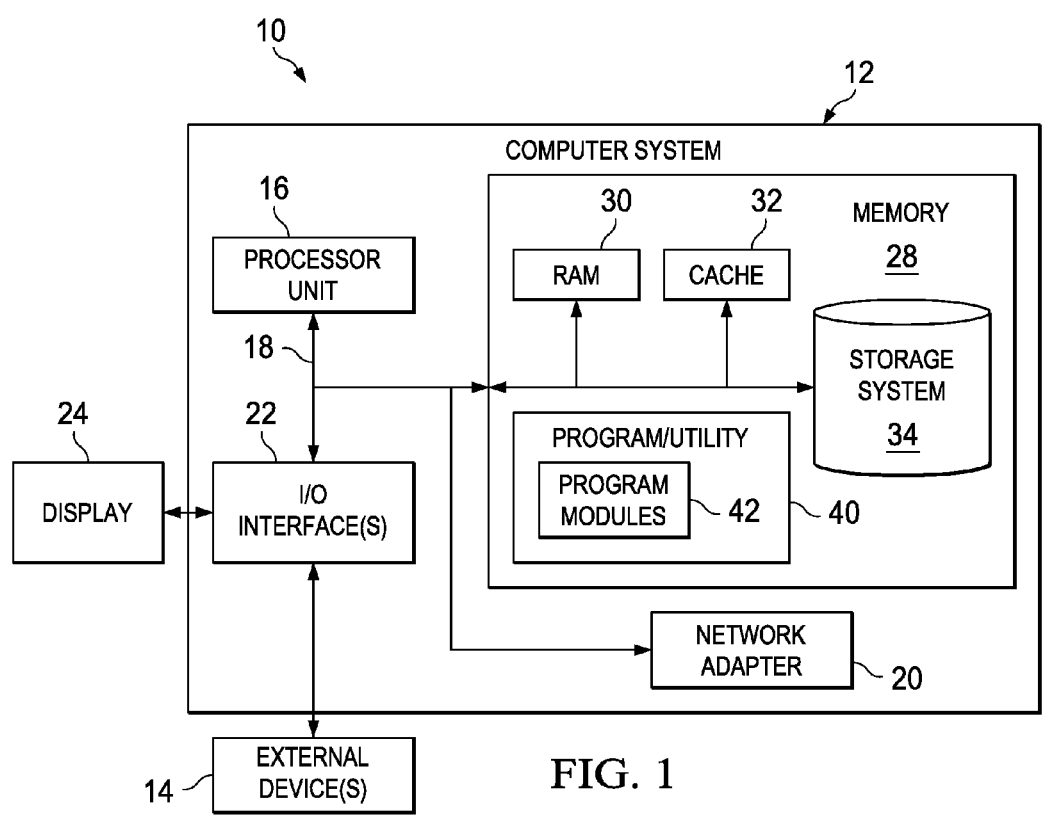
FIG. 1 is an illustration of a block diagram of a cloud computing node in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the Detailed Description includes the following definitions which have been derived from "The NIST Definition of Cloud Computing (Draft)," by Peter Mell and Tim Grance, dated January 2011, which is cited in an information disclosure statement filed herewith.

Cloud computing is a model of service delivery for enabling convenient, on-demand network access to a shared pool of configurable computing that can be rapidly provisioned and released with minimal management effort or interaction with a provider of the service. The computer resources, may be for example, resources networks, network bandwidth, servers, processing, memory, storage, applications, virtual machines, and services. This cloud model may include at least five characteristics, at least three service models, and at least four deployment models.

Characteristics include on-demand self-service, broad network access, resource pooling, rapid elasticity, and measured service. With on-demand self-service: a cloud consumer can unilaterally provision computing capabilities as needed automatically without requiring human interaction with the service's provider. The computer capabilities, include, for example, server time and network storage.

Broad network access involves capabilities that are available over a network and accessed through standard mechanisms that promote use by heterogeneous thin or thick client platforms, such as mobile phones, laptops, and personal digital assistants (PDAs). With resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction. The higher level of abstraction may be, for example, a country, state, or datacenter.

Rapid elasticity involves capabilities that can be rapidly and elastically provisioned, in some cases automatically, to quickly scale out and rapidly release to quickly scale in. To the consumer, the capabilities available for provisioning often appear to be unlimited and can be purchased in any quantity at any time.

With measured service, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models include software as a service (SaaS), platform as a service (PaaS), and infrastructure as a service (IaaS). With software as a service (SaaS), a capability is provided to the consumer to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a service (PaaS) is a capability provided to the consumer to deploy onto the cloud infrastructure consumer-created or acquired applications created using programming languages and tools supported by the provider. The consumer does not manage or control the underlying cloud infrastructure including networks, servers, operating systems, or storage. Instead, the consumer has control over the deployed applications and possibly application hosting environment configurations.

Infrastructure as a service (IaaS) is a capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components. These network components include, for example, host firewalls.

Deployment models include, for example, a private cloud, a community cloud, a public cloud, and a hybrid cloud. A private cloud has a cloud infrastructure that is operated solely for an organization. This type of cloud may be managed by the organization or a third party and may exist on-premises or off-premises.

A community cloud is the cloud infrastructure that is shared by several organizations and supports a specific community that has shared concerns. These concerns include, for example, mission, security requirements, policy, and compliance considerations. A community cloud may be managed by the organizations or a third party. This type of cloud may exist on-premises or off-premises.

A public cloud is the cloud infrastructure that is made available to the general public or a large industry group and is owned by an organization selling cloud services.

A hybrid cloud is the cloud infrastructure that is a composition of two or more clouds. For example, without limitation, a hybrid cloud may be a combination of two or more of a private cloud, a community cloud, and/or public cloud. A hybrid cloud includes clouds that remain unique entities, but are bound together by standardized or proprietary technology that enables data and application portability. The data and application portability includes, for example, cloud bursting for load-balancing between clouds that form the hybrid cloud.

A cloud computing environment is service oriented with a focus on statelessness, low coupling, modularity, and semantic interoperability. At the heart of cloud computing is an infrastructure comprising a network of interconnected nodes.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

With reference now to FIG. 1, a block diagram of an example of a cloud computing node is depicted in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processor unit 16, memory 28, and bus 18 that couples various system components including memory 28 to processor unit 16.

Processor unit 16 executes instructions for software that may be loaded into memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

Memory 28 can include computer system readable media in the form of volatile memory, such as random access memory (RAM) 30 and/or cache 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set of program modules that are configured to carry out the functions of embodiments of the invention. As used herein, a set when referring to items means one or more items.

Program/utility 40, having a set of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, display 24, etc.; one or more devices that enable a user to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processor units, external disk drive arrays, RAID systems, tape drives, and data archival storage systems, etc.

Figure 2:
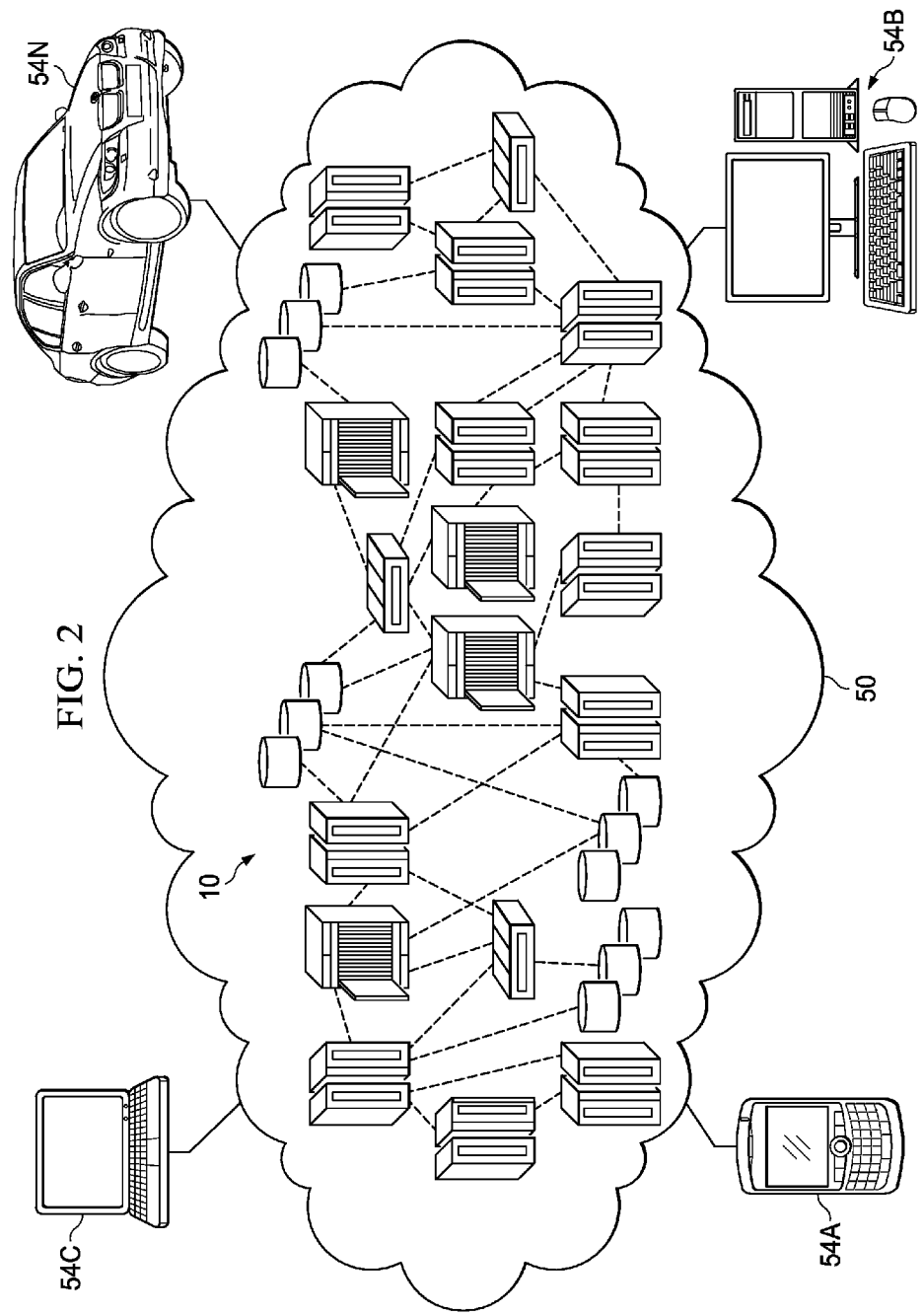
FIG. 2 is an illustration of a cloud computing environment in accordance with an illustrative embodiment.

Referring now to FIG. 2, an illustration of a cloud computing environment is depicted in accordance with an illustrative embodiment. As illustrated, cloud computing environment 50 comprises one or more cloud computing nodes, such as cloud computing node 10 in FIG. 1. The one or more cloud computing nodes may communicate with local computing devices used by cloud consumers, such as, for example without limitation, personal digital assistant (PDA) or cellular telephone 54A, desktop computer 54B, laptop computer 54C, and/or automobile computer system 54N may communicate. Cloud computing node 10 may communicate with other cloud computing nodes. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing node 10 and cloud computing environment 50 can communicate with any type of computerized device over any type of network and/or network addressable connection (e.g., using a web browser). Program code located on one of cloud computing nodes 10 may be stored on a computer recordable storage medium in one of cloud computing node 10 and downloaded to a computing device within computing devices 54A-N over a network for use in these computing devices. For example, a server computer in cloud computing node 10 may store program code on a computer readable storage medium on the server computer. The server computer may download the program code to a client computer in computing devices 54A-N for use on the client computer.

Figure 3:
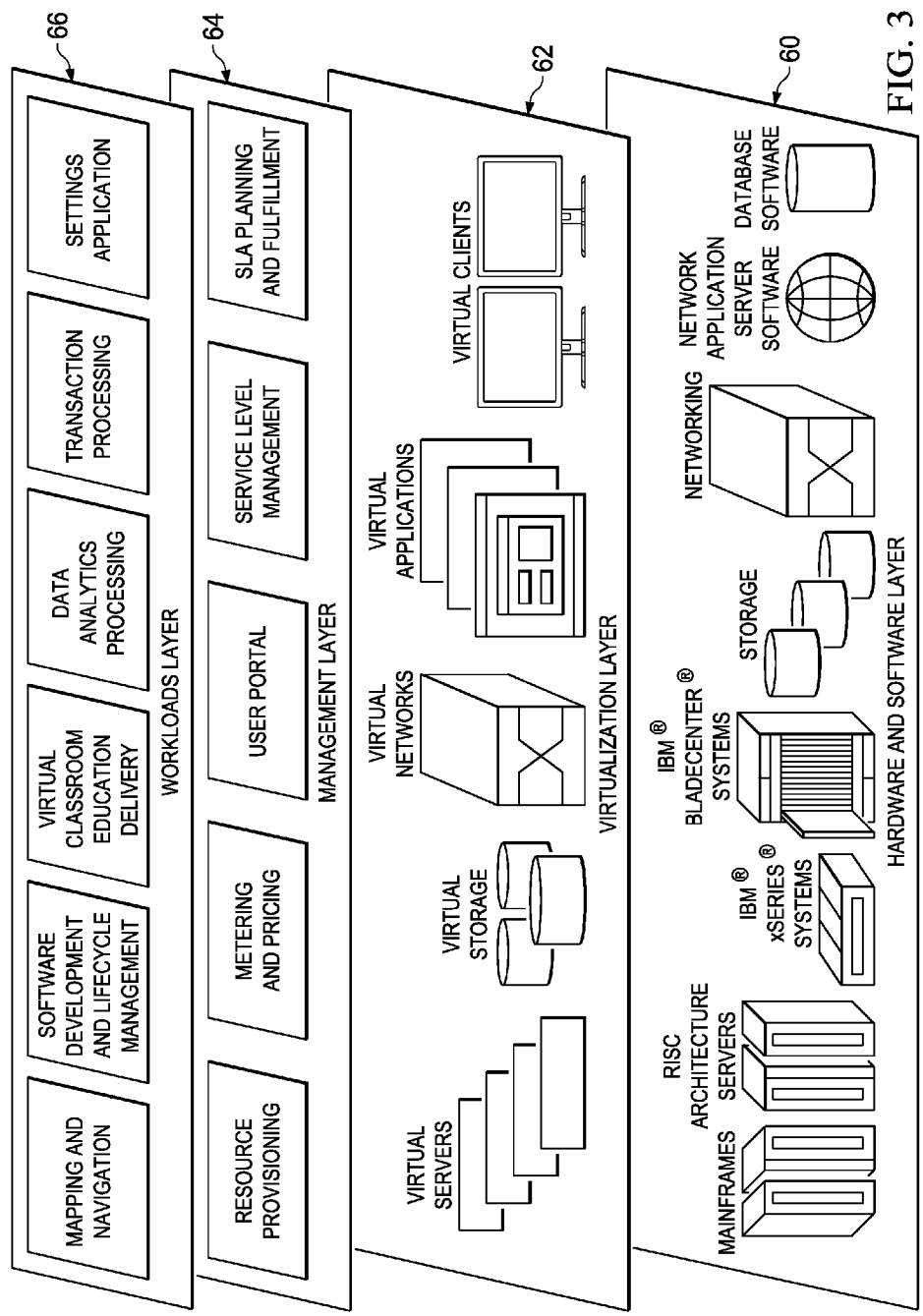
FIG. 3 is an illustration of model layers in accordance with an illustrative embodiment.

With reference now to FIG. 3, an illustration of model layers is depicted in accordance with an illustrative embodiment. The model layers are a set of functional abstraction layers provided by a cloud computing environment, such as cloud computing environment 50 in FIG. 2. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and settings application.

In these examples the settings application is a way to set settings on components in hardware and software layer 60 and virtualization layer 62. For example, settings application may apply settings to hardware and software components in hardware and software layer 60. When a user accesses components in virtualization layer 62 settings for the user can be applied by the settings application.

The different illustrative embodiments recognize and take into account a number of different considerations. For example, the different illustrative embodiments recognize that it may be desirable to have settings for resources being used by a user based on a location of the user. The user may be using the resources over a network connection. Thus, the resources may not be in the same location as the user. The resources may have settings based on the location of the resources. The settings may not be the same as settings for the location of the user.

The different illustrative embodiments recognize and take into account that one solution may involve the user configuring the settings for the resource after the user has gained access to the resources. However, user configuration can be time consuming and inefficient. Further, differences in settings may cause issues in user configuration of settings. For example, differences in certain settings, such as, for example, time settings or currency settings may cause errors for certain applications. In other examples, a user may not be able to understand how to configure settings if differences in language or keyboard settings are present.

The different illustrative embodiments further recognize and take into account that another solution may involve identifying settings for a user based on an identification of the user. Once the user is identified, certain settings for the user may be applied to the resources. However, user identification prior to applying settings to the resources can result in a delay in providing the user with access to the resources. Further, the settings for the user may have to be set up for the user prior to applying the settings.

Thus, the different illustrative embodiments provide a method, data processing system, and computer program product for applying a setting. A request for a set of resources is received. The request is to use the set of resources over a network connection. An address associated with a device from the request is identified. A geographic location of the device is identified based on the address. A set of settings for the set of resources is identified based on the geographic location of the device. The set of settings is applied to the set of resources.

Figure 4:
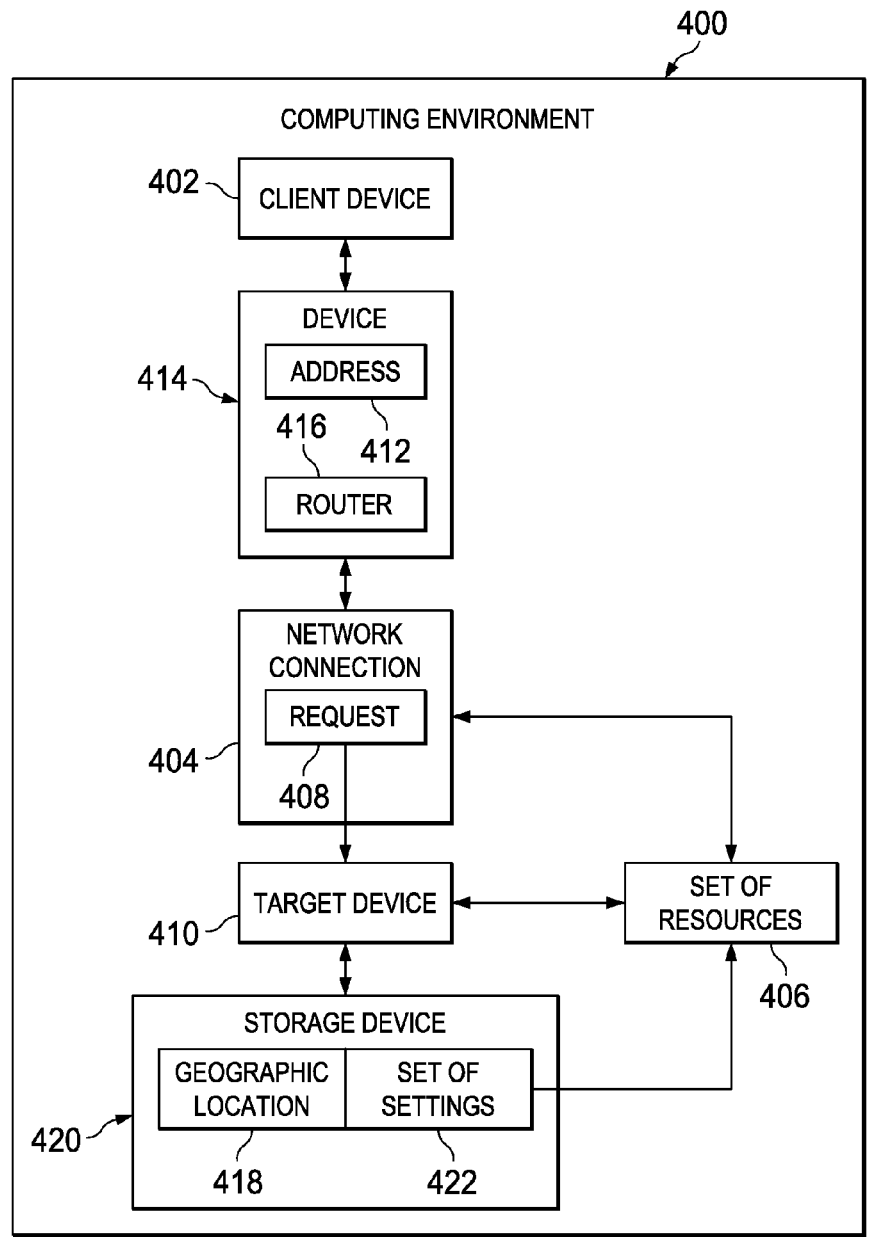
FIG. 4 is a block diagram of a computing environment in accordance with an illustrative embodiment.

With reference now to FIG. 4, a block diagram of a computing environment is depicted in accordance with an illustrative embodiment. In these illustrative examples, computing environment 400 is an environment in which illustrative embodiments may be implemented. In one example, cloud computing environment 50 in FIG. 2 is an embodiment of computing environment 400.

Computing environment 400 includes client device 402, network connection 404, and set of resources 406. In these examples, set of resources 406 is a component that can be accessed by client device 402. For example, set of resources 406 can be hardware and/or software that can be used to perform tasks at client device 402. Set of resources 406 may provide, for example, storage space, network connections, processing capacity, and applications that are accessible at client device 402. For example, without limitation, set of resources 406 may include one or more applications, programs, storage systems, virtual machines, storage devices, hard drives, memories, communication units, processor units and/or servers.

Client device 402 is hardware used to access set of resources 406 over network connection 404. Client device 402 may be for example, without limitation, a desktop computer, a tablet computer, a laptop computer, a mobile phone, a personal electronic device, a thin client, a computer terminal, a graphical user interface and/or any other type of device for accessing resources over a network connection. In this example, set of resources 406 is not physically part of client device 402. Client device 402 accesses set of resources 406 using network connection 404. Network connection 404 may include one or more wireless and/or wired connections.

Client device 402 can obtain access to set of resources 406 by sending request 408 over network connection 404. In these examples, request 408 is to use set of resources 406 over network connection 404. For example, request 408 may be a logon request.

Target device 410 receives request 408. Target device 410 is associated with set of resources 406. For example, target device 410 may be a server that handles requests to access set of resources 406. A first component may be considered to be associated with a second component by being secured to the second component, linked to the second component, fastened to the second component, and/or connected to the second component in some other suitable manner. The first component also may be connected to the second component through using a third component. The first component may also be considered to be associated with the second component by being part of and/or an extension of the second component.

Upon receiving request 408, target device 410 identifies address 412 of device 414. For example, request 408 may include data packets which include address 412 of device 414.

In these examples, address 412 is a way that devices in computing environment 400 can communicate. For example, address 412 may specify a location for a message to be sent to or from in computing environment 400. In one example, address 412 is an internet protocol address.

In these examples, device 414 is the component that sent request 408. Device 414 is associated with client device 402. In one example, device 414 is router 416 that routed request 408 from client device 402 onto network connection 404. In another example, device 414 may be a component within client device 402, such as, for example, a network interface card.

Target device 410 identifies geographic location 418 of device 414 using address 412. For example, target device 410 can identify geographic location 418 by searching storage device 420 for geographic location 418 matching address 412. In these examples, storage device 420 is a database containing information about geographic locations of one or more addresses. For example, storage device 420 may contain information about ranges of internet protocol addresses known to be within a certain geographic location. If address 412 is within a range of addresses known to be at geographic location 418, target device 410 identifies geographic location 418 as the geographic location of device 414.

In this illustrative example, storage device 420 also includes set of settings 422 for geographic location 418. Set of settings 422 is a control that can be modified in set of resources 406. Set of settings 422 is particular to geographic location 418. For example, set of settings 422 includes one or more settings that are commonly used in geographic location 418. Set of settings 422 may include a currency setting, a numbers format, a language setting, a keyboard setting, a dictionary setting, a time zone setting, a date and time format, and/or any other type of settings that can be modified in set of resources 406. Thus, in one example, set of settings 422 may include a setting based on a particular language spoken in geographic location 418.

Target device 410 applies set of settings 422 to set of resources 406. For example, target device 410 may modify text in a file for an operating system associated with set of resources 406. Target device 410 provides client device 402 with access to set of resources 406 over network connection 404. For example, target device 410 may approve request 408. Client device 402 accesses set of resources 406 already having set of settings 422 applied.

In these illustrative examples, target device 410 applies set of settings 422 based on geographic location 418 of device 414. In this manner, set of resources 406 is configured for geographic location 418 of device 414. Thus, when client device 402 uses set of resources 406, set of resources 406 is already configured for geographic location 418 of device 414.

The illustration of computing environment 400 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, target device 410 may be part of set of resources 406. Target device 410 may be one of the resources requested by client device 402. In other examples, target device 410 may be the only resource requested by client device 402.

In other illustrative embodiments, device 414 may be part of client device 402. Thus, address 412 is the address for both device 414 and client device 402. In other examples, device 414 may be connected to client device 402 by one or more wired and/or wireless network connections.

In yet other illustrative embodiments, storage device 420 may include one or more databases in separate locations. For example, storage device 420 may include a first database for mapping internet protocol addresses to geographic locations. In one example, this mapping may occur by searching on the internet. Storage device 420 may also include a second database for mapping geographic locations to different settings.

Figure 5:
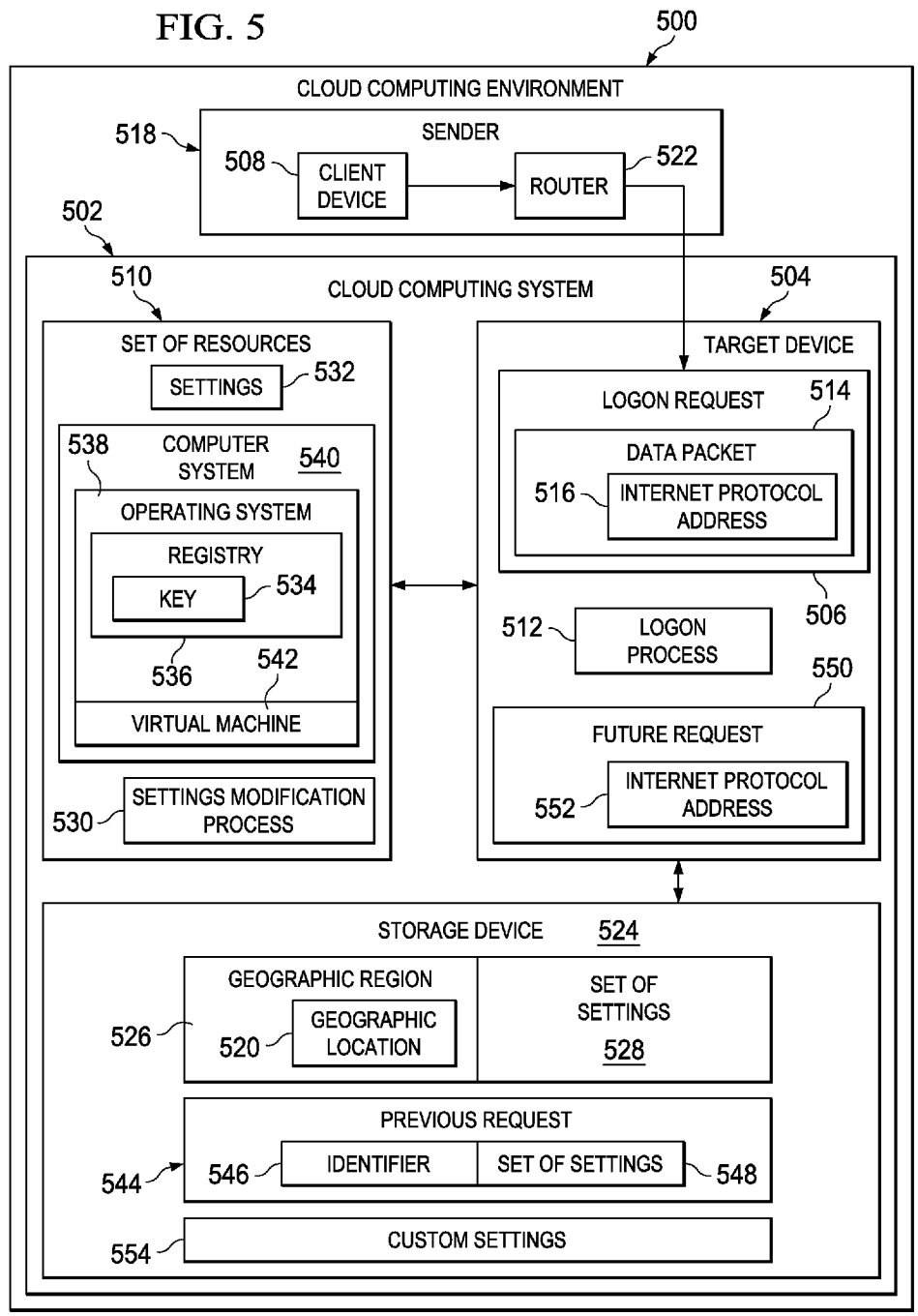
FIG. 5 is a block diagram of a cloud computing environment in which a setting may be applied to resources in accordance with an illustrative embodiment.

With reference now to FIG. 5, a block diagram of a cloud computing environment in which a setting may be applied to resources is depicted in accordance with an illustrative embodiment. In these illustrative embodiments, cloud computing environment 500 is an example of one embodiment of computing environment 400 in FIG. 4. Cloud computing environment 500 includes cloud computing system 502. Cloud computing system 502 includes one or more cloud computing nodes, such as, for example, cloud computing node 10 in FIG. 2.

In these illustrative examples, target device 504 receives logon request 506 sent by client device 508. Target device 504 is an example of one implementation of target device 410 in FIG. 4. In one example, target device 504 is a resource in cloud computing system 502 that client device 508 is trying to access. In another example, target device 504 intercepts logon request 506, where logon request 506 is a request to access set of resources 510. Set of resources 510 is an example of one implementation of set of resources 406 in FIG. 4.

Logon process 512 in target device 504 processes logon request 506. Logon process 512 may be, for example, a script or program running in target device 504. Logon process 512 receives data packet 514. Logon process 512 identifies internet protocol address 516 in data packet 514. In these examples, internet protocol address 516 is the internet protocol address of sender 518 of data packet 514. Logon process 512 uses internet protocol address 516 to identify geographic location 520 of sender 518. Sender 518 is a device located at geographic location 520 that has one or more internet protocol addresses which include internet protocol address 516.

For example, sender 518 may be router 522 that routes logon request 506 from client device 508. Router 522 may route data packets from a plurality of devices in a local area network that includes client device 508. Thus, internet protocol address 516 may be an internet protocol address within a range of internet protocol addresses for router 522. In another example, internet protocol address 516 may be that of client device 508.

Logon process 512 uses internet protocol address 516 to identify geographical location 520 of sender 518. For example, logon process 512 compares at least a portion of internet protocol address 516 with information about known locations of internet protocol addresses stored in storage device 524. In one example, logon process 512 matches a portion of internet protocol address 516, for example, a network prefix, with a network known to be located in geographic location 520. In another example, logon process 512 matches internet protocol address 516 with information about geographic location 520 of internet protocol address 516 stored in storage device 524.

Once geographic location 520 is identified, logon process 512 identifies geographic region 526 of geographic location 520. Geographic region 526 is an area that has set of settings 528 for geographic region 526. For example, geographic region 526 is an area that has set of settings 528 while another geographic region has a different set of settings. For example, without limitation, geographic region 526 may be a city, a country, a province, a state, a continent, and or any other distinct area. Logon process 512 identifies set of settings 528 for geographic region 526. For example, set of settings 528 may be default settings for geographic region 526. Logon process 512 then sends set of settings 528 to settings modification process 530 in set of resources 510.

Settings modification process 530 runs in set of resources 510. Settings modification process 530 modifies settings 532 in set of resources 510. For example, settings modification process 530 may be a script or a program that runs in set of resources 510. In these examples, settings modification process 530 modifies settings 532 with set of settings 528 received from logon process 512. Settings modification process 530 modifies settings 532 by locating a file containing settings 532. Settings modification process 530 modifies one or more settings in settings 532 to match set of settings 528. For example, settings 532 may be modified by changing key 534 for registry 536 in operating system 538 for computer system 540. In one illustrative example, key 534 may be located under "HKEY_CURRENT_USER\Control Panel\International" in registry 536 in operating system 538.

In modifying settings 532, settings modification process 530 may also initiate installation of programs for completing changing of settings 532. For example, settings modification process 530 may initiate installation of a language pack for operating system 538 or applications in computer system 540. In some illustrative embodiments, settings modification process 530 may also apply set of settings 528 to one or more applications in computer system 540. For example, without limitation, set of settings 528 may be applied to a word processing application, a database application, a desktop publishing application, an email application, and/or any other type of application in computer system 540.

Target device 504 provides client device 508 access to set of resources 510 in cloud computing system 502. In one example, set of resources 510 is computer system 540 in the form of virtual machine 542. A user of client device 508 can use virtual machine 542 in cloud computing system 502. In these examples, set of settings 528 is configured on virtual machine 542 based on geographic location 520 of client device 508.

The different illustrative embodiments recognize and take into account that in cloud computing environment 500, client device 508 and set of resources 510 may not be in the same location. In fact, client device 508 and set of resources 510 may be nowhere near each other. Set of resources 510 may have settings configured based on a location of set of resources 510 or based on a prior user of set of resources 510. The different illustrative embodiments identify geographic location 520 of client device 508 and apply set of settings 528 in operating system 538 of virtual machine 542 based on geographic location 520 of client device 508.

In these illustrative embodiments, logon process 512 stores logon request 506 as previous request 544 in storage device 524. For example, logon process 512 stores identifier 546 of internet protocol address 516 in storage device 524. Logon process 512 also stores set of settings 548 in association with identifier 546. Set of settings 548 was used in previous request 544. For example, set of settings 548 may be set of settings 528 for geographic region 526 where client device 508 or router 516 is located.

When target device 504 receives future request 550, logon process 512 can search storage device 524 for identifier 546 in previous request 544 matching internet protocol address 552 in future request 550. Settings modification process 530 can then apply set of settings 548 stored in storage device 524 for previous request 544. In this manner, logon process 512 may not have to perform steps of mapping internet protocol address 552 to geographic location 520, geographic region 526, and set of settings 528. Additionally, in these illustrative embodiments, when logon request 506 is received, logon process 512 can search for previous request 544 without needing to identify geographic location 520 for internet protocol address 516.

In some illustrative embodiments, logon request 506 may also search storage device 524 for custom settings 554. Custom settings 554 are particular to internet protocol address 516. For example, custom settings 544 may have been previously established by a user of client device 508. Custom settings 554 may be established and retrieved using a web application. Settings modification process 530 may apply custom settings 554 in addition to or in place of set of settings 528.

The illustration of cloud computing environment 500 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, illustrative embodiments may be implemented in any type of environment where resources are located remotely to users. For example, without limitation, illustrative embodiments may be implemented in virtual machine environments, software partition environments, and/or small computer system interface (SCSI) environments. In other illustrative environments, logon process 512 and settings modification process 530 may be components of a single process for applying settings in cloud computing environment 500.

Figure 6:
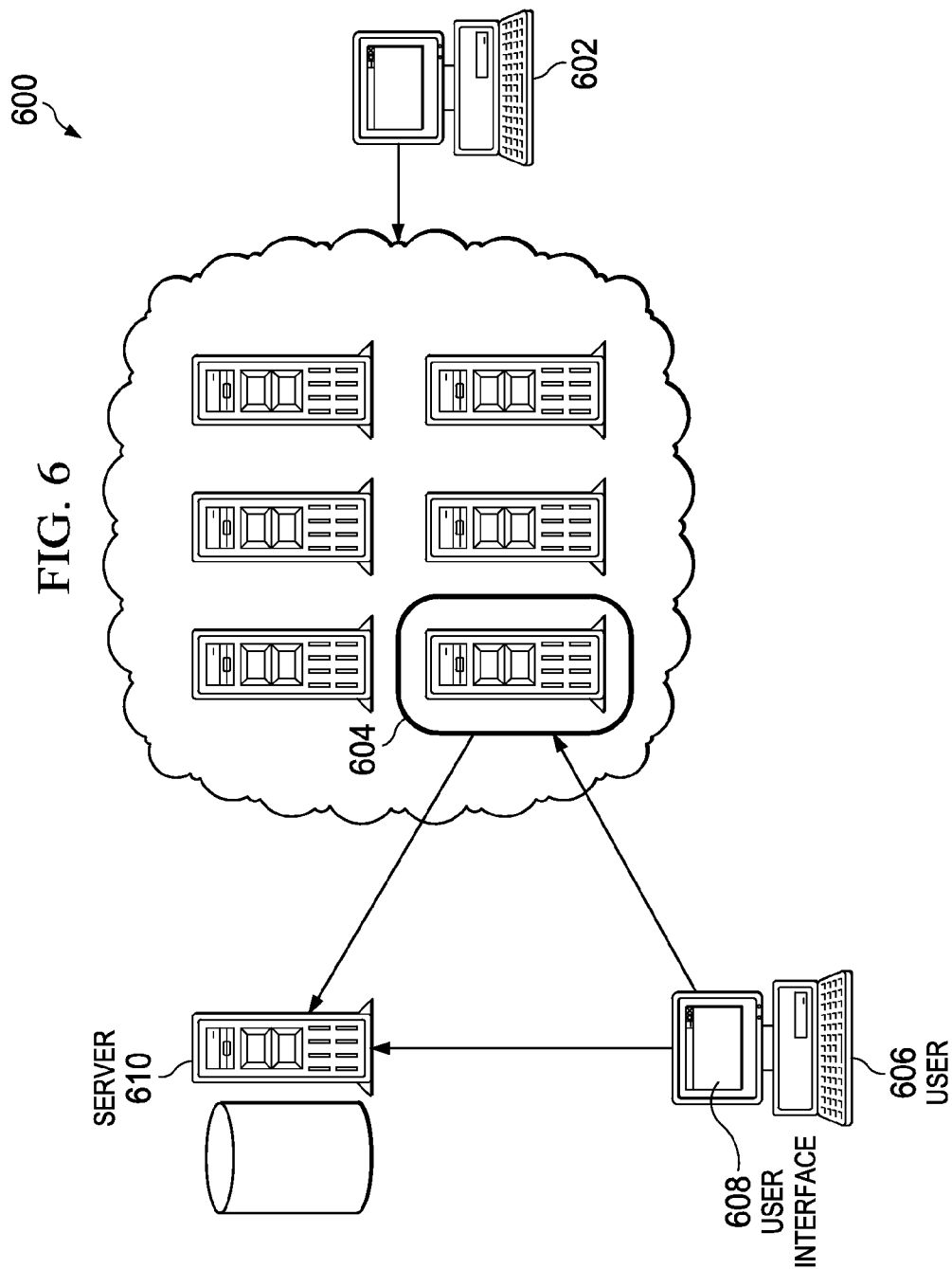
FIG. 6 is an illustration of a cloud computing environment in accordance with an illustrative embodiment.

With reference now to FIG. 6, an illustration of a cloud computing environment is depicted in accordance with an illustrative embodiment. Cloud computing environment 600 is an example of one implementation of cloud computing environment 500 in FIG. 5.

In this illustrative example, cloud administrator 602 provisions cloud computing node 604 for user 606. For example, cloud computing node 604 may be a virtual machine. User 606 logs onto cloud computing node 604 using user interface 608. The request to logon is intercepted by a process for applying settings based on a location of user interface 608. The settings for the location of user interface 608 are applied. Additionally, user 606 may establish custom settings using server 610. Server 610 runs an application that is accessible from user interface 608. User 606 uses the application to establish custom settings that are stored at server 610. When user 606 logs onto cloud computing node 604, server 610 will apply the custom settings to cloud computing node 604.

Figure 7:
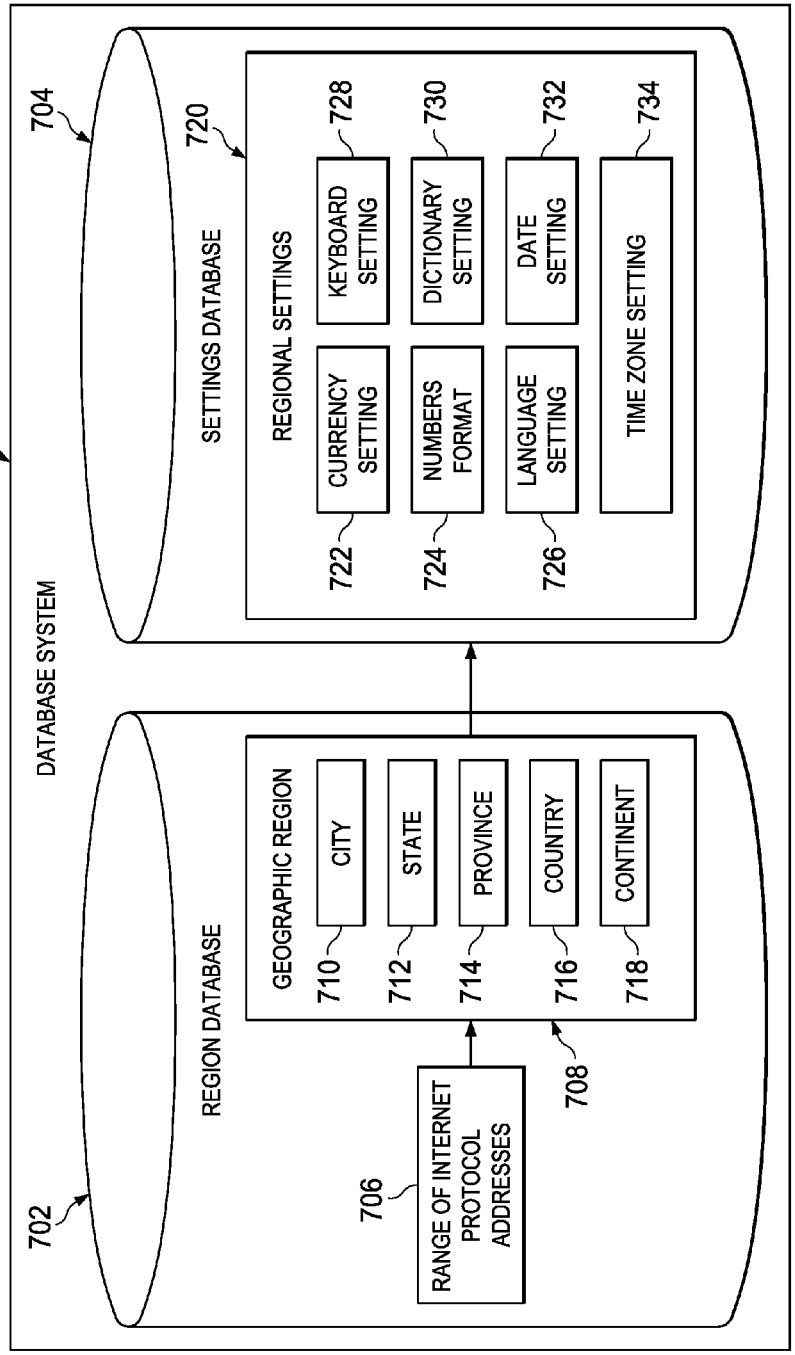
FIG. 7 is a block diagram of a database system in accordance with an illustrative embodiment.

With reference now to FIG. 7, a block diagram of a database system is depicted in accordance with an illustrative embodiment. In these illustrative examples, database system 700 may be implemented in a storage device, such as, for example, storage device 420 in FIG. 4. For example, items stored in storage device 420 in FIG. 4 can be organized and maintained using database system 700.

In this illustrative example, database system 700 includes region database 702 and settings database 704. In some illustrative embodiments, region database 702 and settings database 704 may be located within a common storage device. For example, region database 702 and settings database 704 may be located within a server for applying settings in a cloud computing environment. In another example, region database 702 and settings database 704 may be located in a cloud computing node a user is requesting to access. In other illustrative embodiments, region database 702 and settings database 704 may be located remotely. For example, region database 702 and/or settings database 704 may be accessed over a network connection.

Region database 702 contains information for mapping range of internet protocol addresses 706 to geographic region 708. For example, region database 702 may include lists of at least a portion of a plurality of internet protocol addresses that are located in different geographic regions. In this example, devices having internet protocol addresses within range of internet protocol addresses 706 are within geographic region 708. In these examples, geographic region 708 includes at least one of city 710, state 712, province 714, country 716, and continent 718.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Settings database 704 includes regional settings 720. Regional settings 720 are settings that are specific to one or more regions in geographic region 708. In this example, regional settings 720 includes currency setting 722, numbers format 724, language setting 726, keyboard setting 728, dictionary setting 730, date setting 732, and time zone setting 734. Currency setting 722 is a setting for a type of currency used in geographic region 708. Numbers format 724 may involve use of commas and periods in geographic region 708 to signify decimal places and groups of numbers. Numbers format 724 may also include a type of numbers, such as, for example, Roman numerals or Arabic numerals used in geographic region 708.

Language setting 726 is a type of language used when presenting words in geographic region 708. Keyboard setting 728 is an arrangement of characters on a keyboard in geographic region 708. Dictionary setting 730 is a way certain words are defined in geographic region 708. Date setting 732 is a setting for how date and time information is displayed. Time zone setting 734 is a time zone in geographic region 708.

The illustration of cloud computing environment 600 in FIG. 6 and database system 700 in FIG. 7 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 8:
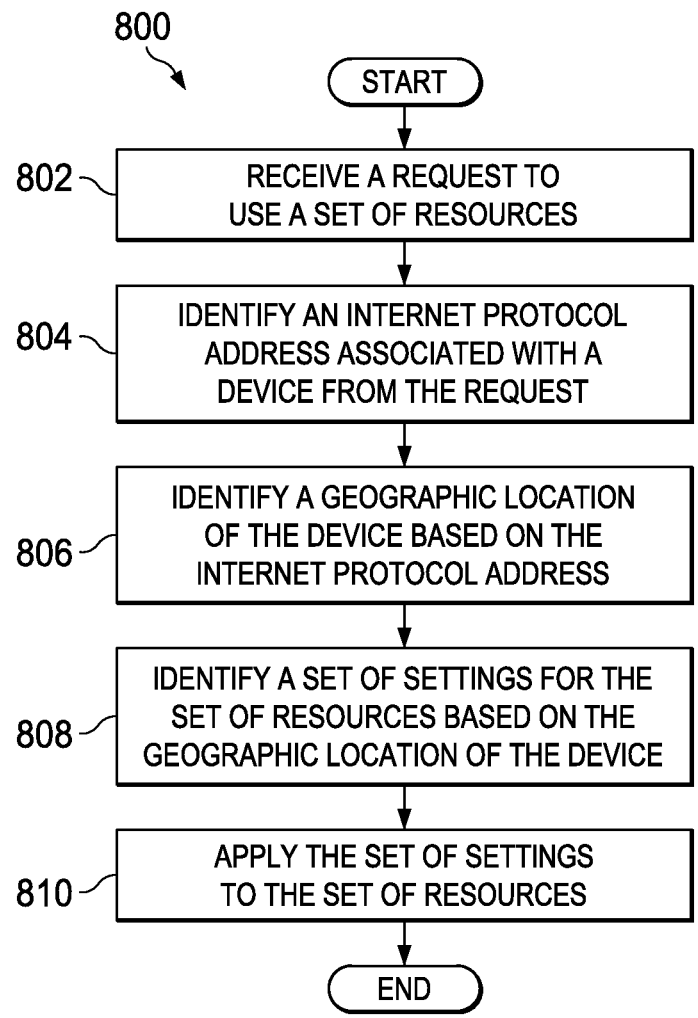
FIG. 8 is a flowchart of a process for applying a setting in accordance with an illustrative embodiment.

With reference now to FIG. 8, an illustration of a flowchart of a process for applying a setting is depicted in accordance with an illustrative embodiment. The process illustrated in FIG. 8 may be implemented in target device 410 in FIG. 4. The process may be implemented by logon process 512 in FIG. 5.

The process begins by receiving a request to use a set of resources (step 802). In step 802, the request is a request to use the set of resources over a network connection. The process then identifies an internet protocol address associated with a device from the request (step 804). In step 804, the process identifies the internet protocol address directly from the request. Thereafter, the process identifies a geographic location of the device based on the internet protocol address (step 806). In step 806, the process may identify the geographic location by searching a database having ranges of internet protocol addresses linked to one or more geographic locations.

The process then identifies a set of settings for the set of resources based on the geographic location of the device (step 808). In step 808, the set of settings include one or more settings that are specific to, for example, without limitation, at least one of a city, a region, a state, a country, a province, and/or a continent where the device is located. For example, without limitation, the settings may include a setting for a currency, a time of day, a numbers format, a language, a keyboard setting, and a dictionary setting used in the geographic location.

Thereafter, the process applies the set of settings to the set of resources (step 810) with the process terminating thereafter. In step 810, the process may apply the set of settings in an operating system of a computer system in the set of resources.

Figure 9:
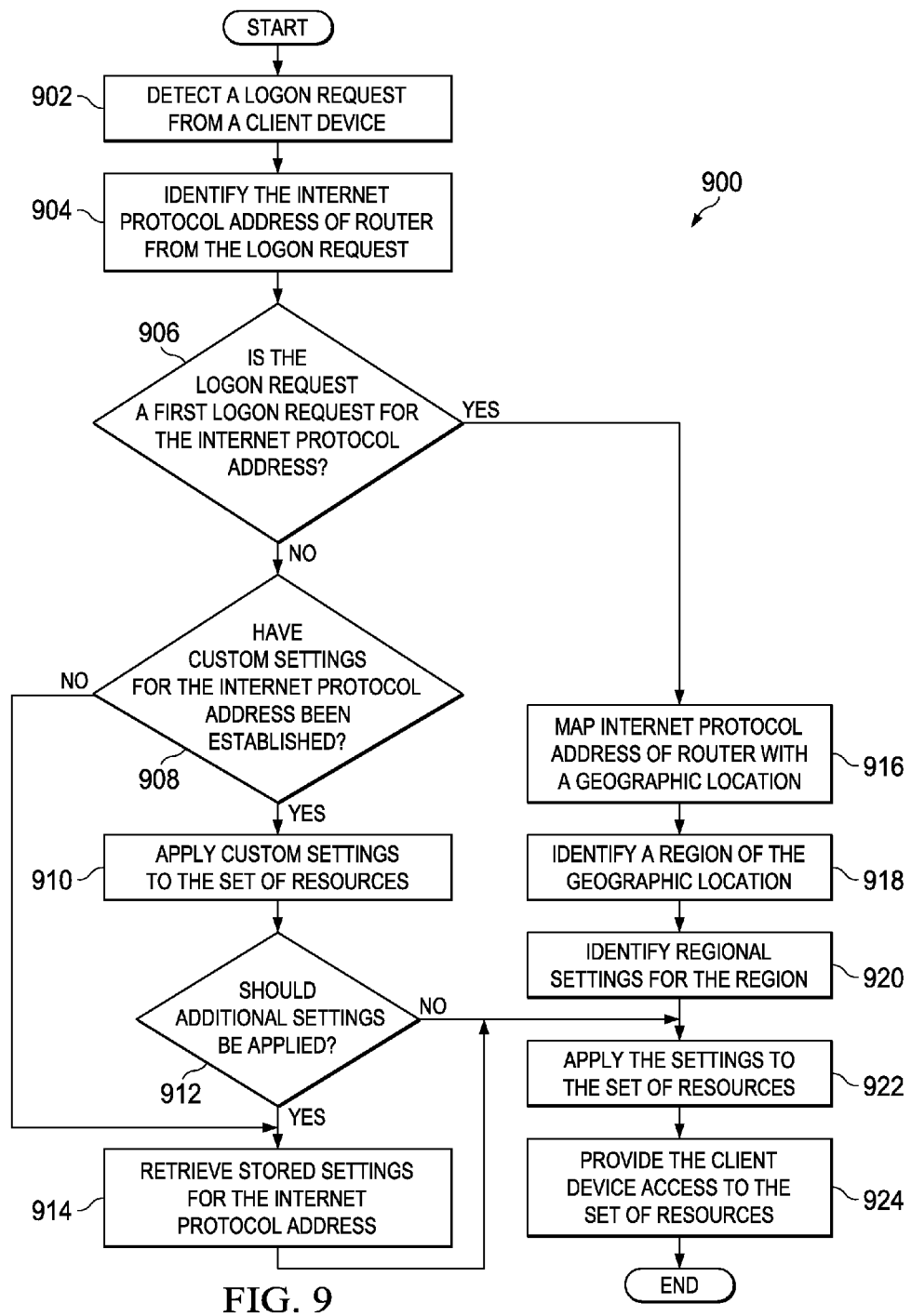
FIG. 9 is a flowchart of a process for applying a set of settings to a set of resources in accordance with an illustrative embodiment.

With reference now to FIG. 9, an illustration of a flowchart of a process for applying a set of settings to a set of resources is depicted in accordance with an illustrative embodiment. The process illustrated in FIG. 9 may be implemented by logon process 512 in FIG. 5. The process also may be implemented in target device 504 and set of resources 510 in FIG. 5.

The process begins by detecting a logon request from a client device (step 902). The process then identifies the internet protocol address of router from the logon request (step 904). In step 904, the process can identify the internet protocol address of router from one or more data packets included in the logon request.

Thereafter, the process determines whether the logon request is a first logon request for the internet protocol address (step 906). In step 906, the process may search a database for a file containing the internet protocol address to determine whether the logon request is a first logon request for the internet protocol address. If the process determines that the logon request is a first logon request for the internet protocol address, the process proceeds to step 916 discussed below.

If the process determines that the logon request is a not first logon request for the internet protocol address, the process determines whether custom settings for the internet protocol address have been established (step 908). In step 908, the process may determine that custom settings for the internet protocol address have been established by searching the file containing the internet protocol address for an indication that custom settings have been established. If the process determines that custom settings for the internet protocol address have not been established, the process proceeds to step 914 discussed below.

If the process determines that custom settings for the internet protocol address have been established, the process applies custom settings to the set of resources (step 910). In step 910, the process may apply the custom settings by retrieving the custom settings using a web application. The process then determines whether additional settings should be applied (step 912). In step 912, the custom settings may include all settings that can be set for the set of resources. If the process determines that additional settings should not be applied, the process proceeds to step 922 discussed below.

If the process determines that additional settings should be applied, the process retrieves stored settings for the internet protocol address (step 914). In step 914, the process can retrieve the stored settings from the file established for the internet protocol address. The stored settings may have been previously established based on the geographic location of the device. Thus, the process can improve the speed and efficiency with which settings are identified by storing previous settings for previous logon requests from the internet protocol address.

If, however, at step 906, the process determines that the logon request is a first logon request, the process maps internet protocol address of router with a geographic location (step 916). Thereafter, the process identifies a region of the geographic location (step 918). The process then identifies regional settings for the region (step 920). Thereafter, the process applies the settings to the set of resources (step 922). In step 922, the process can apply the settings by modifying a key in a registry of an operating system of a computer system in the set of resources. The process then provides the client device access to the set of resources (step 924) with the process terminating thereafter.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 10:
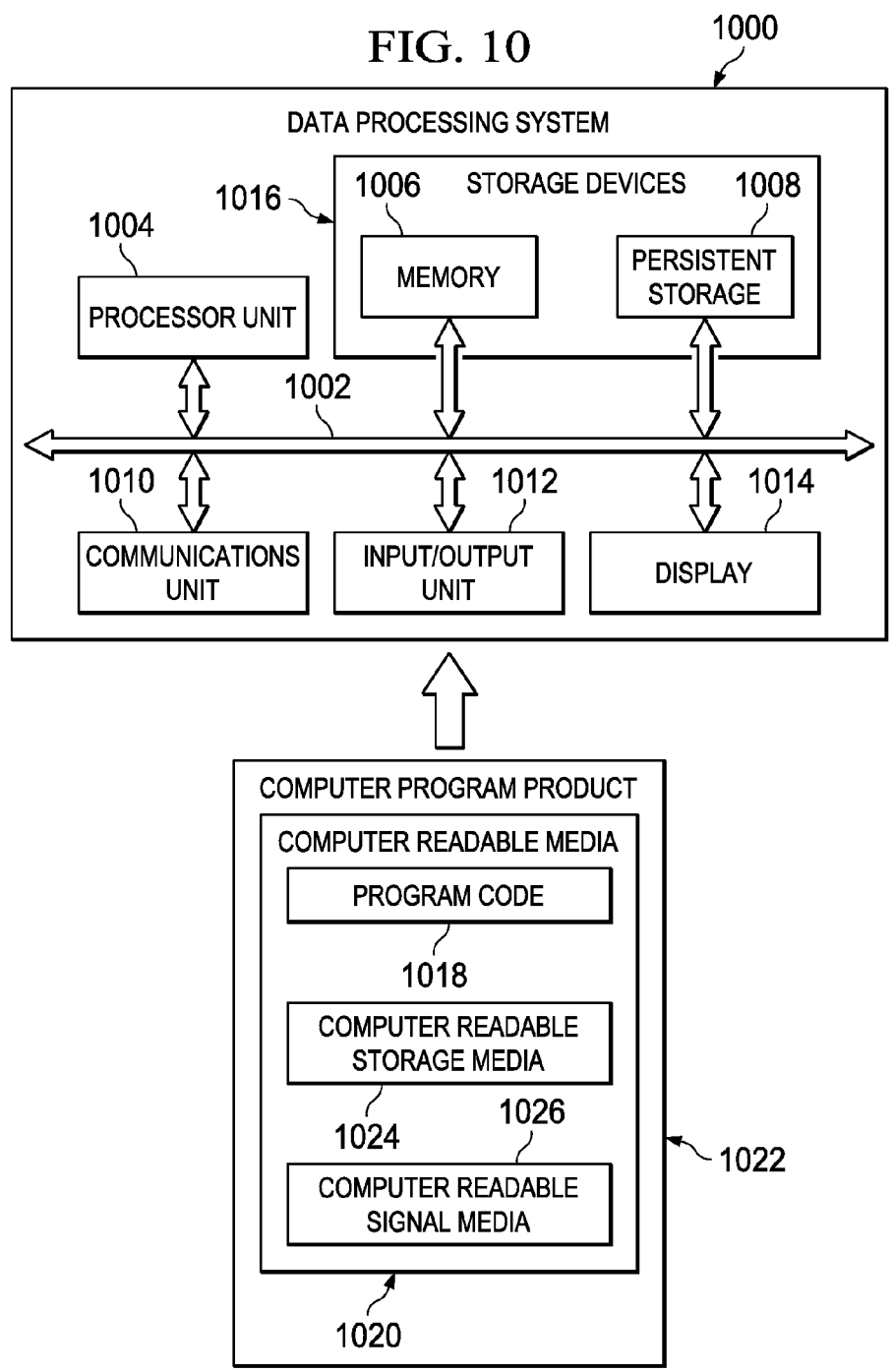
FIG. 10 is an illustration of a data processing system in accordance with an illustrative embodiment.

Turning now to FIG. 10, an illustration of a block diagram of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014. In these illustrative examples, data processing system 1000 is an example of one implementation of target device 410 in FIG. 4. Data processing system 1000 is also one example of one implementation of computer system 540 in FIG. 5.

In this illustrative embodiment, components depicted in data processing system 1000 may be examples of embodiments of set of resources 406 in FIG. 4. Further, data processing system 1000 may also be an example of one embodiment of computer system 12 in FIG. 1. In another example, data processing system 1000 may be used to implement cloud computing nodes in a cloud computing environment, such as, for example, cloud computing node 10 in a cloud computing environment 50 in FIG. 2.

Processor unit 1004 serves to process instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for processing by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and processed by a processor in processor unit 1004. The program code in the different embodiments may be embodied on different physical or tangible computer readable media, such as memory 1006 or persistent storage 1008.

Program code 1018 is located in a functional form on computer readable media 1020 that is selectively removable and may be loaded onto or transferred to data processing system 1000 for processing by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these illustrative examples, computer readable storage media 1024 is a non-transitory computer readable storage medium.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

Storage devices 1016 are examples of implementations of storage device 420 in FIG. 4, as well as 524 in FIG. 5. Further, program code 1018 may include program code for logging on to a set of resources, such as, for example, logon process 512 in FIG. 5. In other examples, program code 1018 may include program code for modifying settings, such as, for example, settings modification process 530 in FIG. 5.

The different components illustrated for data processing system 1000 are not meant to provide architectural limitations to the manner in which different embodiments may be implemented. The different illustrative embodiments may be implemented in a data processing system including components in addition to, or in place of, those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

As another example, a storage device in data processing system 1000 is any hardware apparatus that may store data. Memory 1006, persistent storage 1008, and computer readable media 1020 are examples of storage devices in a tangible form.

The different illustrative embodiments recognize and take into account that it may be desirable to configure settings for resources being used by a user based on a location of the user. In cloud computing environments, client devices and the set of resources in the cloud may not be in the same location. The set of resources may have settings configured based on a location of the set of resources or based on a prior user of set of resources 510 in FIG. 5. The different illustrative embodiments identify a geographic location of the client device and apply settings to the set of resources based on the geographic location of the client device. Thus, when the user of the client device uses the set of resources, the set of resources is already configured for the geographic location of the user.

Additionally, the different illustrative embodiments identify the geographic location of the client device and apply the settings to the set of resources without needing any information beyond the request to access the set of resources. Settings can be applied seamlessly and transparently before users begin to use the resources. As a result, users of cloud computing resources can have an experience tailored to the location of the users while the resources are located and maintained in remote locations across the world.

Thus, the illustrative embodiments provide a computer implemented method, data processing system, and computer program product for applying a setting. A request for a set of resources is received. The request is to use the set of resources over a network connection. An internet protocol address associated with a device from the request is identified. A geographic location of the device is identified based on the internet protocol address. A set of settings for the set of resources is identified based on the geographic location of the device. The set of settings is applied to the set of resources.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for applying a setting, the method comprising:
receiving a request for a set of resources from a first system, wherein the request is to use the set of resources of a third system over a network connection;
identifying an address associated with a device, having sent the request, from the request received by a second system;
identifying a geographic location of the device using a portion of the address identified by the second system;
identifying by the second system a set of settings selected from a group comprising a customized set of settings and a default set of settings stored in a storage device accessible by the second system for use with the set of resources based on the geographic location identified of the device, wherein the set of settings is a control that can be modified in the set of resources; and
applying by the second system the set of settings identified to the set of resources of the third system by modifying one or more settings in an operating system for a computer system in the set of resources wherein the set of settings include regional settings comprising a currency setting, a numbers format setting, a language setting, a keyboard setting, and a dictionary setting.

2. The method of claim 1 further comprising:
responsive to applying the set of settings to the set of resources, providing access to the set of resources to a client device associated with the request from the first system.

3. The method of claim 1, wherein applying the set of settings identified to the set of resources of the third system comprises:
modifying text in a file in the operating system for the computer system in the set of resources of the third system.

4. The method of claim 3, wherein modifying the settings in the operating system for the computer system in the set of resources of the third system comprises:
modifying a key in a registry of the operating system for the computer system.

5. The method of claim 1 further comprising:
storing the set of settings and an identifier for the address identified in a storage device associated with the set of resources of the third system.

6. The method of claim 1 further comprising:
responsive to identifying the address associated with the device, having sent the request, from the request received, determining whether a previous request from the address identified had been received at the set of resources of the third system; and
responsive to determining that the previous request including the address had been received at the set of resources of the third system, identifying the set of settings from information stored about the previous request, wherein the information about the previous request is stored in a storage device associated with the set of resources of the third system.

7. The method of claim 1 further comprising:
responsive to identifying the address associated with the device, having sent the request, from the request, determining whether the customized set of settings has been created for requests from the address identified; and
responsive to a determination the customized set of settings has been created, applying the customized set of settings to the set of resources of the third system, wherein the customized set of settings take precedence over the default set of settings.

8. The method of claim 1, wherein the set of resources of the third system are part of a cloud computing environment, wherein the device is a router connecting a client device of the first system to the set of resources of the third system in the cloud computing environment, and wherein the request is logon request received by a cloud computing node in the cloud computing environment.

9. The method of claim 1, wherein values in the set of settings are based on a geographic region in which the device of the first system was located when the request was sent and wherein the address is an Internet protocol address.

10. The method of claim 9, wherein the geographic region is selected from one of a city, a country, a province, a state, and a continent and wherein the set of settings include values representative of settings comprising a currency setting, a numbers format setting, a language setting, a keyboard setting, and a dictionary setting for the set of resources.

11. A cloud computing system, the cloud computing system comprising:
a set of resources;
a storage device storing a set of settings for a region; and
a target device of a second system associated with the set of resources of a third system, wherein the target device receives a request from a first system to use the set of resources over a network connection, identifies an address associated with a router of the first system from which the request sent, identifies a geographic location of the router using a portion of the address identified, identifies a set of settings selected from a group comprising a customized set of settings and a default set of settings stored in a storage device accessible by the second system for use with the set of resources based on the geographic location identified of the device, wherein the set of settings is a control that can be modified in the set of resources, retrieve the set of settings selected for the set of resources for the geographic location in the region identified, and apply the set of settings selected to the set of resources of the third system by modifying one or more settings in an operating system for a computer system in the set of resources wherein the set of settings selected include regional settings comprising a currency setting, a numbers format setting, a language setting, a keyboard setting, and a dictionary setting.

12. The cloud computing system of claim 11, wherein the target device is configured to modify the one or more settings in the operating system for the computer system in the set of resources of the third system by modifying a key in a registry of the operating system for the computer system.

13. The cloud computing system of claim 11, wherein the storage device stores the set of settings and an identifier for the address and wherein the target device is further configured to retrieves the set of settings selected from the storage device in a future request received from the router of the first system.

14. The cloud computing system of claim 11, wherein the set of settings are based on a geographic region in which the router was located when the request was sent and wherein the address is an Internet protocol address.

15. The cloud computing system of claim 14, wherein the geographic region is selected from one of a city, a country, a province, a state, a continent and wherein the set of settings include regional settings comprising one or more of a currency setting, a numbers format setting, a language setting, a keyboard setting, and a dictionary setting for the set of resources.

16. A computer program product for applying a setting, the computer program product comprising:
a set of computer readable storage devices;
program code, stored on at least one of the set of computer readable storage devices, which when executed by a computer directs the computer to:
receive a request for a set of resources of a third system, from a first system wherein the request is to use the set of resources over a network connection;
identify an address associated with a device, having sent the request, from the request received by a second system;
identify a geographic location of the device using a portion of the address identified by the second system;
identify by the second system a set of settings selected from a group comprising a customized set of settings and a default set of settings stored in a storage device accessible by the second system for use with the set of resources based on the geographic location identified of the device, wherein the set of settings is a control that can be modified in the set of resources; and
apply by the second system the set of settings identified to the set of resources of the third system by modifying one or more settings in an operating system for a computer system in the set of resources of the third system wherein the set of settings include regional settings comprising a currency setting, a numbers format setting, a language setting, a keyboard setting, and a dictionary setting.

17. The computer program product of claim 16 further comprising:
program code, stored on at least one of the set of computer readable storage devices, which when executed by the computer directs the computer to:
provide access to the set of resources to a client device associated with the request from the first system in response to applying the set of settings to the set of resources.

18. The computer program product of claim 16, wherein the program code stored on at least one of the set of computer readable storage devices, which when executed by the computer to direct the computer to apply the set of settings identified to the set of resources of the third system further directs the computer to:
modify text in a file in the operating system for the computer system in the set of resources of the third system.

19. The computer program product of claim 18, wherein the program code stored on at least one of the set of computer readable storage devices, which when executed by the computer to direct the computer to modify the text in a file in the operating system for the computer system in the set of resources of the third system further directs the computer to:
modify a key in a registry of the operating system for the computer system.

20. The computer program product of claim 16 further comprising:
program code, stored on at least one of the set of computer readable storage devices, which when executed by the computer to direct the computer to:
determine whether a previous request from the address identified had been received at the set of resources of the third system in response to identifying the address associated with the device having sent the request from the request received; and
identify the set of settings from information stored about the previous request in response to determining that the previous request including the address had been received at the set of resources of the third system, wherein the information about the previous request is stored in a storage device associated with the set of resources of the third system.

21. A data processing system for applying a setting, the data processing system comprising:
a bus system;
a storage device connected to the bus system, wherein the storage device includes program code; and
a processor unit connected to the bus system, wherein the processor unit executes the program code to:
receive a request for a set of resources, from a first system, wherein the request is to use the set of resources of a third system over a network connection;
identify an address associated with a device, having sent the request, from the request received by a second system;
identify a geographic location of the device using a portion of the address identified by the second system;
identify by the second system a set of settings selected from a group comprising a customized set of settings and a default set of settings stored in a storage device accessible by the second system for use with the set of resources based on the geographic location identified of the device, wherein the set of settings is a control that can be modified in the set of resources; and
apply by the second system the set of settings identified to the set of resources of the third system by modifying one or more settings in an operating system for a computer system in the set of resources wherein the set of settings include regional settings comprising a currency setting, a numbers format setting, a language setting, a keyboard setting, and a dictionary setting.

22. The data processing system of claim 21, wherein the processor unit further executes the program code to provide access to the set of resources to a client device associated with the request from the first system in response to applying the set of settings to the set of resources.

23. The data processing system of claim 21, wherein in applying the set of settings to the set of resources the processor unit further executes the program code to modify text in a file in the operating system for the computer system in the set of resources of the third system.

24. The data processing system of claim 23, wherein in modifying the text in a file in the operating system for the computer system in the set of resources of the third system the processor unit further executes the program code to modify a key in a registry of the operating system for the computer system.

25. The data processing system of claim 21, wherein the processor unit further executes the program code to determine whether a previous request from the address identified had been received at the set of resources of the third system in response to identifying the address associated with the device, having sent the request from the request and identify the set of settings from information stored about the previous request in response to determining that the previous request including the address identified had been received at the set of resources of the third system, wherein the information about the previous request is stored in a storage device associated with the set of resources of the third system.

* * * * *